US005426448A

United States Patent [19]

Seal

[11] Patent Number: 5,426,448

[45] Date of Patent: Jun. 20, 1995

[54] PIXEL DISPLAY PALETTE

[75] Inventor: David J. Seal, Cambridge, Great Britain

[73] Assignee: Advanced Risc Machines Limited, Cambridge, United Kingdom

[21] Appl. No.: 168,774

[22] Filed: Dec. 15, 1993

[30] Foreign Application Priority Data

Dec. 22, 1992 [GB] United Kingdom ................. 9226700

[51] Int. Cl.[6] ................................................ H04N 9/74

[52] U.S. Cl. .................................... 345/153; 345/150; 345/199; 395/131; 395/166

[58] Field of Search ............... 345/155, 199, 202, 150, 345/153, 199; 395/131, 166

[56] References Cited

U.S. PATENT DOCUMENTS

| | | | |
|---|---|---|---|
| 4,155,095 | 5/1979 | Kirschner | 345/150 |
| 4,799,053 | 1/1989 | Van Aken et al. | 345/199 |
| 5,113,506 | 5/1992 | Moussouris et al. | 395/400 |
| 5,227,863 | 7/1993 | Bilbrey et al. | 348/578 |

FOREIGN PATENT DOCUMENTS 2195519 6/1987 United Kingdom .

OTHER PUBLICATIONS

Inmos, "IMS G174 high colour palette-DAC with Pix-Mix", Nov. 1991, #42 1543 00.

*Primary Examiner*—Richard Hjerpe
*Assistant Examiner*—Walter Malinowski
*Attorney, Agent, or Firm*—Albert C. Smith

[57] ABSTRACT

An apparatus for mapping a logical pixel value 2 defining pixel appearance to a plurality of physical appearance component values for driving a display device is described. Read addresses for a plurality of palettes 4, 6, 8 and 10 are derived from bits of the logical pixel value. The portions of the logical pixel value which are used to provide these read addresses overlap. Multiple storage of given physical appearance values GPV0, GPV1, . . . within the palettes is provided so as to ensure the appropriate output irrespective of what particular value a bit has that is non-significant for that palette. Three component color palettes 4, 6 and 8 addressed with 8-bit addresses are provided together with an effects palette 10 addressed by a 4-bit address. In the case of a 16-bit logical pixel value, the system has the flexibility to support any of 6-5-5, 5-6-5 or 5-5-6 depending upon what is stored within the color palettes.

13 Claims, 5 Drawing Sheets

PIXEL DISPLAY PALETTE

BACKGROUND OF THE INVENTION

1. Field of the Invention

This invention relates to the field of pixel display palettes that map a logical pixel value defining pixel appearance to a plurality of physical appearance component values for driving a display device.

2. Description of the Prior Art

It is known within the display systems of computers to provide palettes that map a data word forming a logical pixel value into three physical component values for driving a display device (e.g. a colour monitor). The logical pixel value defines a particular colour which is formed by a combination of three primary colours having particular relative intensities. The primary colours are usually red, green and blue. Each of these primary colours has a component palette associated with it that acts as a look up table addressed via a predetermined set of the bits forming the logical pixel value and outputting a particular component intensity value stored at the particular address accessed within the palette.

It is usual for computers to operate on 1, 2, 4, 8, 16 or 32-bit data words for use as both logical pixel values and their data processing in general. The RAM, long term storage and other systems within the computer are tailored to operate with data words of these lengths.

A problem that arises in such systems is that 8-bit, 16-bit or 32-bit data words are not suited to being partitioned to represent three different primary colour intensities, i.e. these numbers are not divisible by three. Consider the case of each logical pixel value being a 16-bit word. The partitioning of 16-bit logical pixel values has previously been handled in one of two ways.

The first way is that one bit is effectively discarded and five bits are allocated for each colour. This is known as 5-5-5 configuration. The discarding of one bit in every sixteen makes inefficient use of the finite memory and storage resources within the computer system.

The second way is to allocate six bits to one colour and five bits to the other two colours. This technique is referred to as a 6-5-5, 5-6-5 or 5-5-6 configuration (the allocation order being red, green, blue in this nomenclature). A disadvantage of this approach is the lack of flexibility that results from adopting a configuration in which one of the colour components is given twice the number of possible states than the other two colour components.

Another option would be to provide palettes with $2^{16}$ locations and each addressed by the full 16-bit logical pixel values, the partitioning between components being achieved by appropriately loading the palettes with physical appearance component values at the locations indicated by the significant bits of the logical pixel value for that palette. Whilst such an approach gives flexibility, it is impractical to use such large palettes.

SUMMARY OF THE INVENTION

It is an object of this invention to provide a technique whereby the above mentioned disadvantages may be reduced.

Viewed from one aspect this invention provides apparatus for mapping a logical pixel value defining pixel appearance to a plurality of physical appearance component values for driving a display device, said apparatus comprising:

(i) a plurality of physical appearance component palettes each storing a range of values for one physical appearance component; and (ii) means responsive to an input logical pixel value for reading a physical appearance component value from a read address in each of said physical appearance component palettes, said read address being given by at least one bit of said logical pixel value, wherein at least two of said read addresses partially overlap to share at least one bit from said logical pixel value.

The invention recognises that by deriving the read addresses for the palettes from the logical pixel value, it is not necessary to keep the bits of the logical pixel value from which each read address is produced fixed. The read addresses can partially overlap to share bits of the logical pixel value. Whether a particular bit of the logical pixel value is significant for one component or another component will be determined by the contents of the palette rather than be the inflexible configuration of the hardware of the palette addressing system. If a particular bit of a read address is not significant for a given component, then both storage locations within the palette corresponding to either state of that non-significant bit will be loaded with the same physical appearance component value.

The use of logical pixel values mapped to physical appearance component values stored in respective palettes could be used in a system in which one physical component is luminance and the other is a display effect such as steady, flashing, wipe, fade etc. However, it will be appreciated that the invention is particularly applicable to systems in which said plurality of physical appearance component values comprises three colour component values.

Such three colour component display systems can advantageously be used in combination with an additional physical appearance component value for controlling display characteristics other than colour, e.g. display effects. This is particularly the case when the display effects component value controls video mixing.

It will be appreciated that an advantage of increased flexibility is present if only two of the read addresses overlap within the logical pixel value. However, flexibility is still further improved in systems in which said logical pixel value has N bits, a read address for a first colour component comprises bits O to Y of said logical pixel value, a read address for a second colour component comprises bits X to Z of said logical pixel value, and a read address for a third colour component comprises bits (Y+1) to N of said logical pixel value, where $X<Y<Z<N$.

In this arrangement the read address for the second colour component overlaps with both the read address for the first component and the read address for the third component and has no bits from the logical pixel value that are exclusive to it. This arrangement yields particularly great flexibility as to how the bits of the logical pixel value can be divided between the differing physical appearance components.

In the above arrangement it is preferred that $(Y-X+1)=(Z-Y)$. Making the overlap of the read address for the ;second component equal for each of the read addresses of the first component and the third component once again improves flexibility.

With the above arrangement it is preferred when providing a display effects component value that a read address for said display effects component value comprises one of:

bits E to N of said logical pixel value, where Z<-E<N; and bits O to E of said logical pixel value, where E<X.

It will be appreciated that the invention is applicable to logical pixel values of any length. However, the problems of the trade off between efficiency of memory and storage usage and flexibility are particularly apparent in the case where the logical pixel value has 16 bits. In this case it is preferred that N=16, X =4, Y=7 and Z=11 and that said display effects component value comprises 4 bits.

A complementary aspect of the structure of the apparatus in which the read addresses of differing physical appearance component values are shared is that the palettes should be loaded with appropriate component values to take account of this sharing. To this end those physical appearance component palettes having read addresses comprising one or more significant bits used to define that corresponding physical appearance component and one or more non-significant bits used to define another physical appearance component store a respective common physical appearance component value at those addresses sharing significant bit values.

Viewed from another aspect this invention provides a method of mapping a logical pixel value defining pixel appearance to a plurality of physical appearance component values for driving a display device, said method comprising the steps of:

(i) storing a range of values for a plurality of physical appearance components with a corresponding one of a plurality of physical appearance component palettes; and (ii) reading, in response to an input logical pixel value, a physical appearance component value from a read address in each of said physical appearance component palettes, said read address being given by at least one bit of said logical pixel value, wherein at least two of said read addresses partially overlap to share at least one bit from said logical pixel value.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
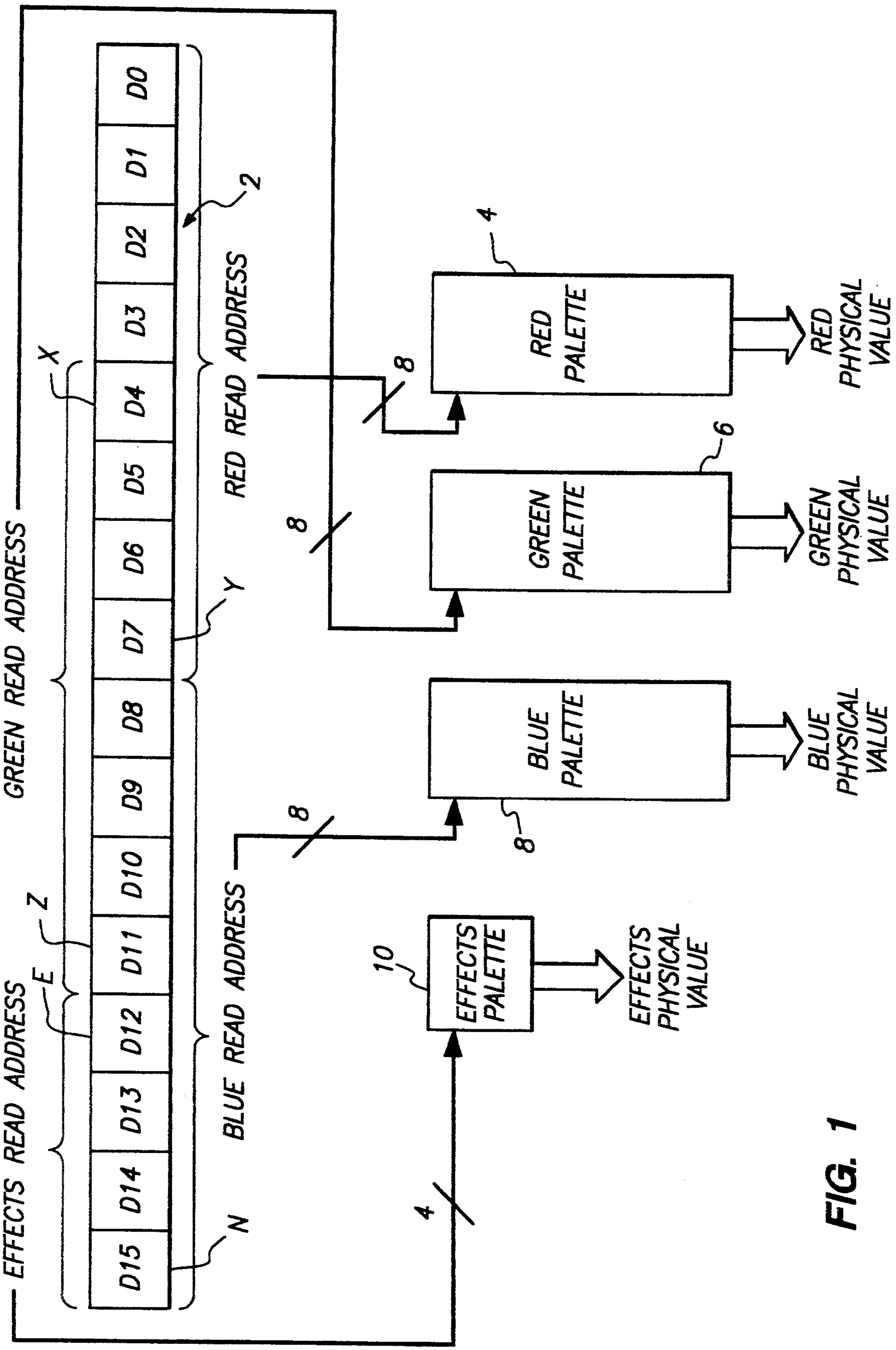
FIG. 1 schematically illustrates how a logical pixel value addresses respective physical appearance component palettes.

FIG. 1 shows a 16 bit logical pixel value 2 having respective bits D0 to D15. Bits D0 to D7 are fed as a red read address (8-bit) to a red palette 4. Bits D4 to D11 are fed as a green read address (8-bit) to a green palette 6. Bits D8 to D15 are fed as a blue read address (8-bit) to a blue palette 8. Bits D12 to D15 are fed as an effects read address (4-bit) to an effects palette 10.

The read addresses fed to the palettes 4, 6, 8 and 10 access a particular location within the palette where a physical appearance value is stored. This addressed physical appearance value is output from the palette and used to drive a display device such as a monitor (not illustrated).

In more general terms, the red read address is formed from bits O to Y, the green read address is formed from bits X to Z, the blue read address is formed from bits (Y+1) to N and the effects read address is formed from bits E to N.

Figure 2:
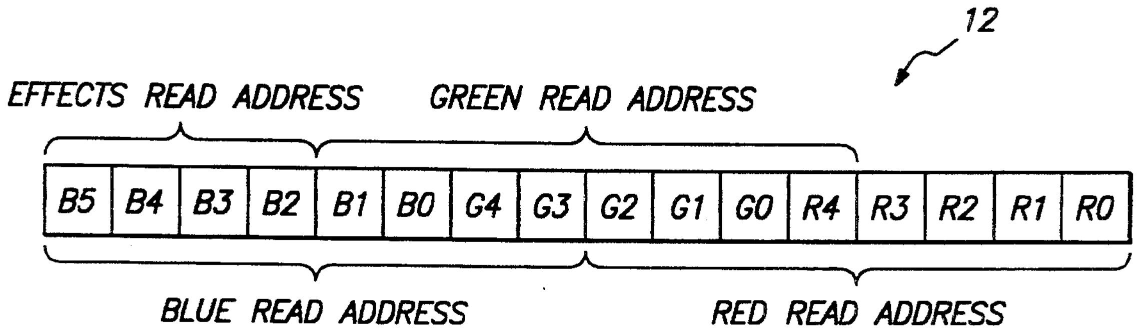
FIG. 2 illustrates an example of how a logical pixel value may be partitioned between the different physical appearance component values.

FIG. 2 shows a particular partitioning of a logical pixel value 12 between the respective three colour components. Bits D0 to D4 are significant for the red address, bits D5 to D9 are significant for the green address and bits D10 to D15 are significant for the blue address. This corresponds to a 5-5-6 configuration (red: green: blue). All the bits of the effects read address are non-significant for this logical pixel value.

Figure 3:
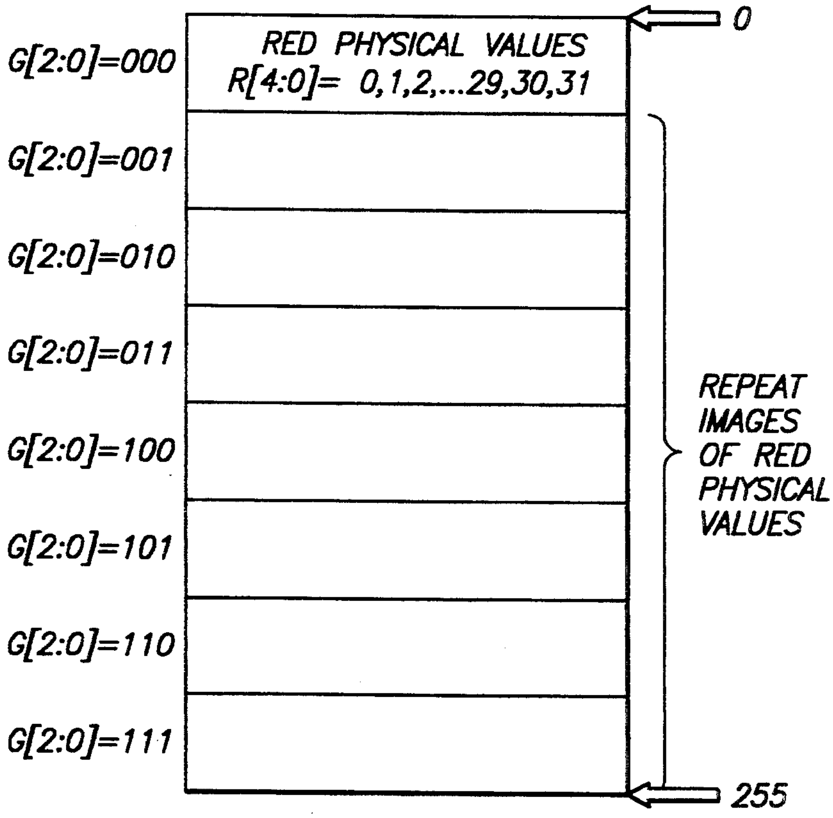
FIGS. 3 to 6 illustrate the physical appearance component values loaded within the respective physical appearance component palettes for the logical pixel value of FIG. 2.

FIG. 3 illustrates the data stored within the red palette for the example of FIG. 2. The red palette has 256 address locations each storing an 8-bit red physical value. The uppermost three bits of the red read address are non-significant for the red physical values and in fact comprise the bits G[2:0] of the green address. For the first 32 addresses within the red palette the value of G[2:0] is 000; the first 32 addresses store the 32 possible different red physical values at respective locations R[4:0]=0,1,2, . . . 29,30,31.

The next 32 address locations within the red palette have a value of G[2:0] of 001. The lower five bits of the red read address are repeats of the lower five bits for the first 32 address locations. Thus, address locations 32 to 63 within the red palette contain a repeat image of the red physical values stored within addresses 0 to 31. This repeating image arrangement is present for each of the other six values of G[2:0].

Figure 4:
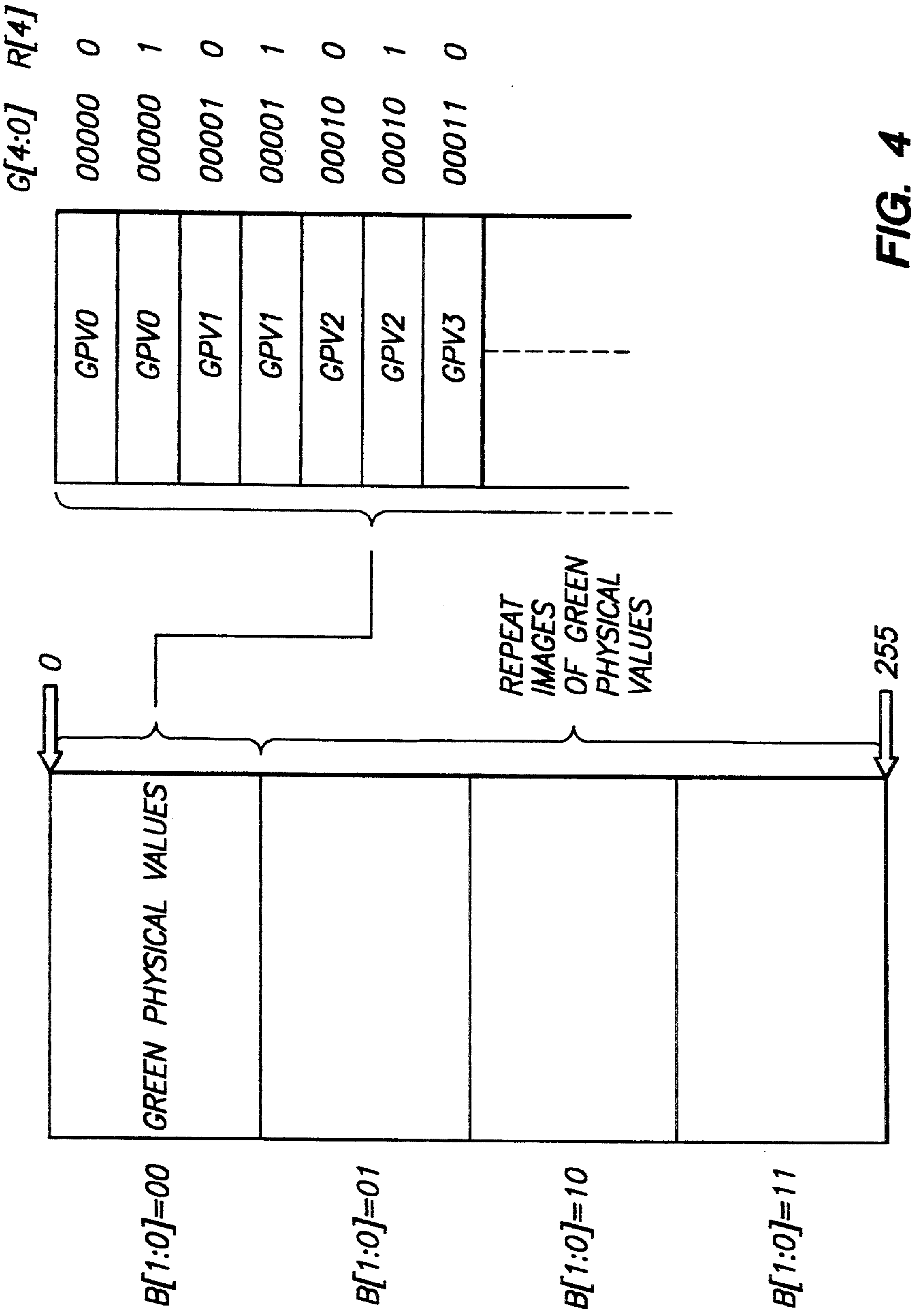

FIG. 4 illustrates the data stored within the green palette for the logical pixel value illustrated in FIG. 2. The green read address has a non-significant lowest value that is the most significant bit R[4] of the red specifying portion of the logical pixel value. The uppermost two bits of the green read address are non-significant for the green physical value and in fact comprise the lower two bits B[1:0] of the blue portion of the logical pixel value.

That the uppermost two bits of the green read address are nonsignificant has the effect of causing four repeat images of the green physical values to be stored within address locations 0 to 63, 64 to 127,128 to 191 and 192 to 255 of the green palette. This is analogous to the repeat images of the red physical values illustrated in FIG. 3.

An additional factor for the green physical values is that the lowermost bit of the address is also non-significant. The result of this is that each green physical value is repeated twice in adjacent palette address locations corresponding to the two possible values of the lowermost bit of the green address. Thus, address locations 0 and 1 both correspond to the same significant bits for specifying the green value, i.e. G[4:0]=00000, and so address locations 0 and 1 both store the same green physical appearance value GPV0. The paired adjacent storage of respective green physical appearance values is repeated within the 64 address locations that are themselves then subsequently repeated three further times to take account of the non-significance of the upper two bits of the green address.

Figure 5:
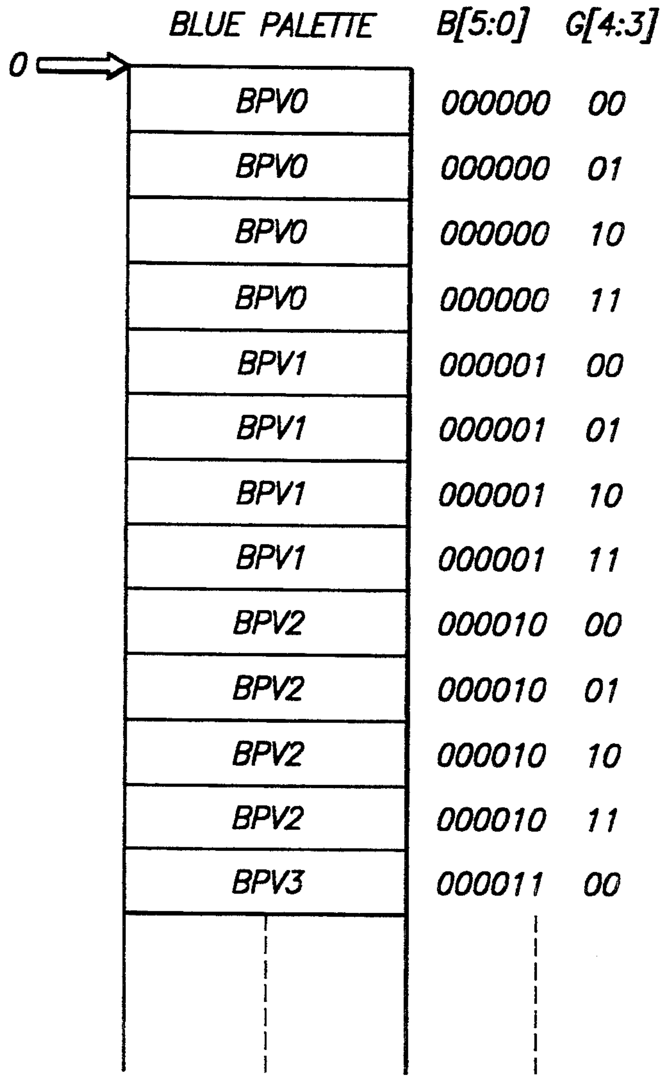

FIG. 5 illustrates the data stored within the blue palette. The blue read address has as its two lowest bits the non-significant bits G[4:3]. The upper six bits of the blue address are all significant and comprise B[5:0]. The consequence of this is that four successive address locations within the blue palette, all having the same uppermost six bits, store a common blue physical value independent of the value of the lower two bits of the address. Since there are six significant bits within the blue address, it is possible to store 64 different blue physical values as contrasted with the 32 possible physical values for the green and red components.

Figure 6:
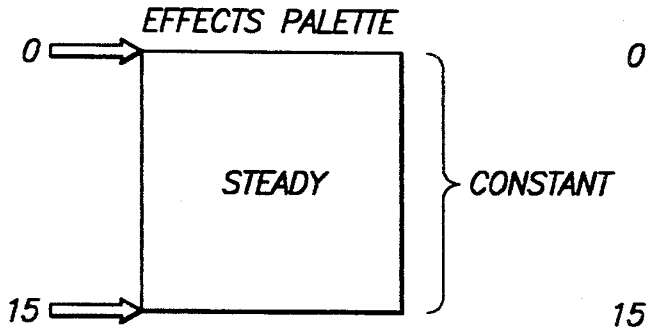

FIG. 6 illustrates the contents of the effects palette. The logical address shown in FIG. 2 has no significant bits for the effects palette. Thus, whatever effect is desired must be constant for all logical pixel values since there is no way of specifying any different effect. In the case illustrated, the four bits of the effects read address access a 16 location effects palette with each location storing a 4-bit effects physical value that causes a steady display of the pixel.

Figure 7:
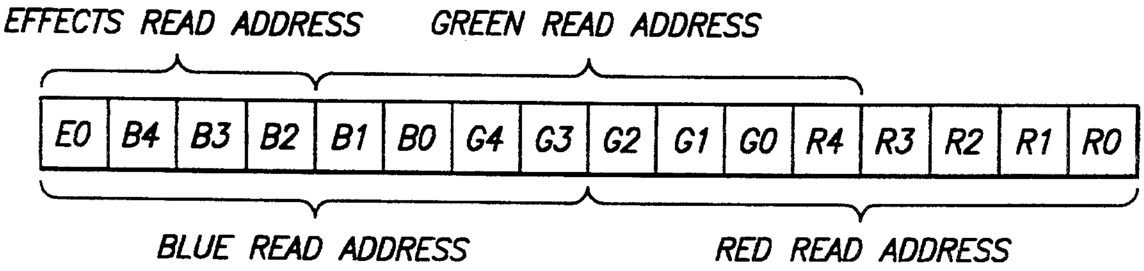
FIG. 7 illustrates an alternative partitioning of the logical pixel value.

FIG. 7 illustrates an alternative logical pixel value. This logical pixel value is the same as illustrated in FIG. 2 except that the most significant bit D15 has been changed from being significant within the blue address as D5 to being a single significant bit for the effects read address E[0]. The addressing and contents of the green palette and the red palette are unaltered.

Figure 8:
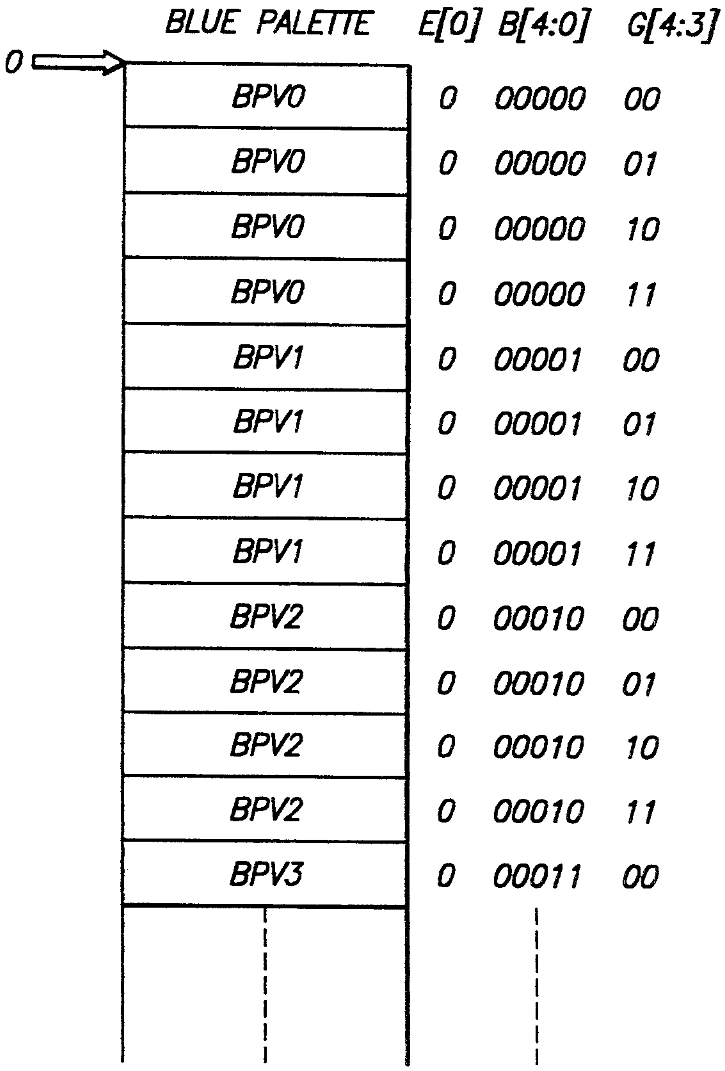

FIG. 8 illustrates the contents of the blue palette. In contrast to FIG. 5, the uppermost bit of the blue address is now non-significant as it comprises E[0] of the effects read address. Thus, the first half of the blue palette at addresses corresponding to E[0]=0 contain a first set of blue physical appearance values and the second half of the blue palette corresponding to addresses with E[0]=1 contain a repeat image of the blue physical appearance value stored in the first half. As in FIG. 5, since the two lowest bits of the blue address are non-significant, the blue physical appearance value for a common value of B[4:0] are repeated in an adjacent four addresses within the blue palette.

Figure 9:
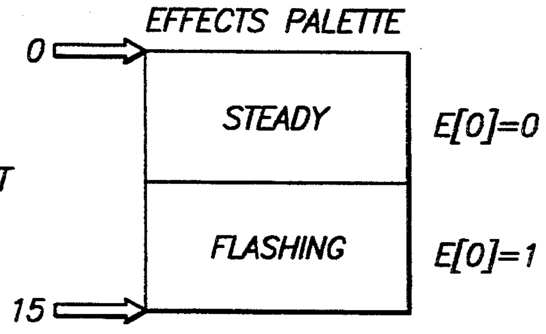
FIGS. 8 and 9 illustrate how the physical appearance component values stored within two of the physical appearance component palettes illustrated in FIGS. 5 and 6 are modified to take account of the different logical pixel value of FIG. 7.

FIG. 9 illustrates the contents of the effects palette. The effects palette is addressed by a 4-bit address and so contains sixteen address locations each storing an effects physical value. Only the uppermost bit of the effects read address is significant. Thus, the first half of the palette at address locations 0 to 7 for which E[0]=0 contain effects physical values that cause the pixel to be steadily displayed. In contrast, the second half of the effects palette from address locations 8 to 15 for which the value of E[0]=1 store an effects physical value that causes the display device to display that pixel as a flashing pixel.

If more bits within the logical pixel value are devoted to the effects read address, then more effects physical values can be supported and complex physical visual appearances such as fading and wiping can be achieved.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for mapping a logical pixel value defining pixel appearance to a plurality of physical appearance component values for driving a display device, said apparatus comprising:

(i) a plurality of physical appearance component palettes each storing a range of values for one physical appearance component; and (ii) means, responsive to an input logical pixel value, for reading a physical appearance component value from each of said physical appearance component palettes at a read address, said read address being given by at least one bit of said logical pixel value, wherein at least two of said read addresses concurrently derived from said input logical pixel value and concurrently applied to respective physical appearance component palettes partially overlap to share at least one bit from said logical pixel value.

2. Apparatus as claimed in claim 1, wherein said plurality of physical appearance component values comprises three colour component values.

3. Apparatus as claimed in claim 2, wherein said plurality of physical appearance component values comprises a display effects component value for controlling display characteristics other than colour.

4. Apparatus as claimed in claim 3, wherein said display effects component value controls video mixing.

5. Apparatus as claimed in claim 2, wherein said logical pixel value has N bits, a read address for a first colour component comprises bits O to Y of said logical pixel value, a read address for a second colour component comprises bits X to Z of said logical pixel value, and a read address for a third colour component comprises bits (Y+1) to N of said logical pixel value, where $X<Y<Z<N$.

6. Apparatus as claimed in claim 5, wherein $(Y-X+1)=(Z-Y)$.

7. Apparatus as claimed in claim 5, wherein said plurality of physical appearance component values comprises a display effects component value for controlling display characteristics other than colour and a read address for said display effects component value comprises one of:

bits E to N of said logical pixel value, where $Z<E<N$; and bits O to E of said logical pixel value, where $E<X$.

8. Apparatus as claimed in claim 5, wherein N=16, X=4, Y=7 and Z=11.

9. Apparatus as claimed in claim 7, wherein N=16, X=4, Y=7 and Z=11 and said display effects component value comprises 4 bits.

10. Apparatus as claimed in claim 1, wherein those physical appearance component palettes having read addresses comprising one or more significant bits used to define that corresponding physical appearance component and one or more non-significant bits used to define another physical appearance component store a respective common physical appearance component value at those addresses sharing significant bit values.

11. A method of mapping a logical pixel value defining pixel appearance to a plurality of physical appearance component values for driving a display device, said method comprising the steps of:

(i) storing a range of values for a plurality of physical appearance components with a corresponding one of a plurality of physical appearance component palettes; and (ii) reading, in response to an input logical pixel value, a physical appearance component value in each of said physical appearance component palettes, at a read address said read address being given by at least one bit of said logical pixel value, wherein at least two of said read addresses concurrently derived from said input logical pixel value and concurrently applied to respective physical appearance component palettes partially overlap to share at least one bit from said logical pixel value.

12. Apparatus for mapping a logical pixel value defining pixel appearance to a plurality of physical appearance component values for driving a display device, said apparatus comprising:

(i) a plurality of physical appearance component palettes each storing a range of values for one physical appearance component; and (ii) means, responsive to an input logical pixel value, for reading a physical appearance component value from each of said physical appearance component palettes at a read address, said read address being given by at least one bit of said logical pixel value, wherein at least two of said read addresses concurrently derived from said input logical pixel value and concurrently applied to respective physical appearance component palettes partially overlap to share at least one bit from said logical pixel value, wherein each read address has one or more significant bits that define one physical appearance component and one or more non-significant bits that define a different physical appearance component; and wherein each of the read addresses, having said one or more significant bits that define the same physical appearance component, stores corresponding physical appearance component values in a common physical appearance component palette.

13. A method of mapping a logical pixel value defining pixel appearance to a plurality of physical appearance component values for driving a display device, said method comprising the steps of:

(i) storing a range of values for a plurality of physical appearance components with a corresponding one of a plurality of physical appearance component palettes; and (ii) reading, in response to an input logical pixel value, a physical appearance component value in each of said physical appearance component palettes, at a read address said read address being given by at least one bit of said logical pixel value, wherein at least two of said read addresses concurrently derived from said input logical pixel value and concurrently applied to respective physical appearance component palettes partially overlap to share at least one bit from said logical pixel value, wherein each read address has one or more significant bits that define one physical appearance component and one or more non-significant bits that define a different physical appearance component; and wherein each of the read addresses, having said one or more significant bits that define the same physical appearance component, stores corresponding physical appearance component values in a common physical appearance component palette.

* * * * *